(12) United States Patent
Uh

(10) Patent No.: US 8,263,253 B2
(45) Date of Patent: Sep. 11, 2012

(54) SECONDARY BATTERY

(75) Inventor: Hwa Il Uh, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/458,061

(22) Filed: Jun. 30, 2009

(65) Prior Publication Data

US 2010/0068616 A1 Mar. 18, 2010

(30) Foreign Application Priority Data

Sep. 18, 2008 (KR) .................. 10-2008-0091636

(51) Int. Cl.
*H01M 2/00* (2006.01)

(52) U.S. Cl. ........ 429/163; 429/162; 429/176; 429/177; 429/186; 429/153

(58) Field of Classification Search .................. 429/176, 429/186, 163, 180
See application file for complete search history.

(56) References Cited

U.S. PATENT DOCUMENTS

| | | | | |
|---|---|---|---|---|
| 4,053,692 | A * | 10/1977 | Dey ............................. | 429/171 |
| 6,574,111 | B1 | 6/2003 | Gyenes et al. | |
| 6,620,544 | B1 * | 9/2003 | Shin et al. ....................... | 429/56 |
| 2002/0090549 | A1 * | 7/2002 | Urade et al. .................. | 429/174 |
| 2004/0180261 | A1 * | 9/2004 | Saito et al. ................... | 429/176 |
| 2005/0089753 | A1 * | 4/2005 | Yoon ............................ | 429/180 |
| 2006/0099494 | A1 | 5/2006 | Jung et al. | |
| 2006/0099500 | A1 * | 5/2006 | Jeon ............................. | 429/174 |
| 2006/0246349 | A1 | 11/2006 | Uh | |
| 2007/0037045 | A1 | 2/2007 | Takeshita et al. | |
| 2007/0160904 | A1 | 7/2007 | Uh | |
| 2007/0232123 | A1 * | 10/2007 | Uh ................................ | 439/404 |
| 2009/0286146 | A1 | 11/2009 | Hansson et al. | |

FOREIGN PATENT DOCUMENTS

| | | |
|---|---|---|
| CN | 101000950 A | 7/2007 |
| DE | 102005028066 B3 | 12/2006 |
| JP | 2000-011980 A | 1/2000 |
| JP | 2004-006363 A | 1/2004 |
| JP | 2006-108099 A | 4/2006 |
| JP | 2006-310268 A | 11/2006 |
| JP | 2007-265762 A | 10/2007 |
| JP | 2008-091260 A | 4/2008 |
| JP | 2008-091260 A | 7/2008 |
| JP | 2008-192414 A | 8/2008 |
| JP | 2008-204770 A | 9/2008 |
| KR | 10 1998-0028932 A | 7/1998 |
| KR | 1020070097143 * | 10/2007 |
| KR | 10 2007-0106813 A | 11/2007 |

OTHER PUBLICATIONS

Korean Notice of Allowance in KR 10-2008-0091636, dated Nov. 12, 2010 (UH.)

* cited by examiner

*Primary Examiner* — Patrick Ryan
*Assistant Examiner* — Alex Usyatinsky
(74) *Attorney, Agent, or Firm* — Lee & Morse, P.C.

(57) ABSTRACT

A secondary battery including an electrode assembly; a can having an opening at an upper portion thereof and housing the electrode assembly; a cap assembly sealing the opening of the can; and an insulation case disposed between the electrode assembly and the cap assembly, the insulation case having an impact absorber configured to deform and absorb an external impact.

14 Claims, 8 Drawing Sheets

SECONDARY BATTERY

BACKGROUND

1. Field

Embodiments relate to a secondary battery.

2. Description of the Related Art

In general, in a secondary battery, an electrode assembly—in which a positive electrode plate, a negative electrode plate, and a separator interposed therebetween are wound in a jelly-roll configuration—may be housed in a can together with electrolyte. An opening at the upper end of the can may be sealed by a cap assembly. In a square type secondary battery, the can may take the form of a substantially parallelepipedal shaped metal container and may be formed by a machining method, e.g., deep drawing.

The cap assembly may include a cap plate coupled to an upper portion of the can, a gasket for insulating the cap plate at the outer surface of the cap plate, an electrode terminal inserted into a terminal through-hole formed in the cap plate, an insulation plate under the cap plate, and a terminal plate under the insulation plate and electrically connected to the electrode terminal. The negative electrode of the electrode assembly may be electrically connected to the electrode terminal, and the positive electrode of the electrode assembly may be electrically connected to the cap plate.

An insulation case insulating the electrode assembly and the cap assembly under the terminal plate may be attached to the upper surface of the electrode assembly and the lower surface of the cap assembly. In other words, the cap assembly may be insulated from the electrode assembly by the insulation case and may be coupled to the opening at the upper end of the can to seal the can.

When a physical impact is applied to a conventional secondary battery in a standard test, e.g., a drop test, the insulation case may be pressed downward by the cap plate; or the short edges of the insulation case may not be restored to their original state after the impact due to a protrusion on the lower surface of the cap plate. The insulation case may continuously press against the upper surface of the electrode assembly, which may cause a short circuit between the electrodes and which may cause deformation of the electrode assembly.

SUMMARY

Embodiments are therefore directed to a secondary battery, which substantially overcome one or more of the problems due to the limitations and disadvantages of the related art.

It is therefore a feature of an embodiment to provide a secondary battery that is resistant against impact.

At least one of the above and other features and advantages may be realized by providing a secondary battery including an electrode assembly, a can having an opening at an upper portion thereof and housing the electrode assembly, a cap assembly sealing the opening of the can, and an insulation case disposed between the electrode assembly and the cap assembly, the insulation case having an impact absorber configured to deform and absorb an external impact.

The cap assembly may include a cap plate, the cap plate may have short edges with lower portions, and protrusions at the lower portions of the short edges, the insulation case may include a body having a plate-like shape defining a bottom of the insulation case and having short edges, long edges and a lower surface, and first side walls protruding upward from the short edges of the body, and the impact absorber may include first tapered portions tapered from a lower surface of the body toward the short edges of the body.

An angle of the first tapered portions may be about 13 to about 48 degrees with respect to the lower surface of the body.

The insulation case may have second side walls protruding upward from the long edges of the body and the impact absorber may further include second tapered portions tapered from the lower surface of the body toward the long edges of the body.

An angle of the second tapered portions may be about 13 to about 48 degrees with respect to the lower surface of the body.

The insulation case may contact the protrusions.

The first tapered portions may be disposed under the protrusions.

The insulation case may include a body having a plate-like shape defining a bottom of the insulation case and having short edges and long edges, and first side walls protruding upward from the short edges of the body, and the impact absorber may have a convex portion protruding upward along a direction substantially parallel to the long edges of the body.

The body may include a first short edge and a second short edge opposite to the first short edge, and the convex portion may have a rounded shape and extends from the first short edge to the second short edge of the body.

The insulation case may have an interior and the first side walls may be inclined toward the interior of the insulation case.

The first side walls may include outer surfaces, the insulation case may have corners where the lower surface of the body meets the outer surfaces of the first side walls and the corners may be rounded.

The insulation case may include a body having a plate-like shape defining a bottom of the insulation case and having short edges and long edges, and first side walls protruding upward from the short edges of the body, and the impact absorber may have a concave portion protruding downward along a direction substantially parallel to the long edges of the body.

The insulation case may have an interior and the first side walls may be inclined toward the interior of the insulation case.

The first side walls may include outer surfaces, the insulation case may have corners where the lower surface of the body meets the outer surfaces of the first side walls and the corners may be rounded.

The insulation case may include a body having a plate-like shape defining a bottom of the insulation case and having short edges and long edges, first side walls protruding upward from the short edges of the body, and second side walls protruding upward from the long edges of the body, and the impact absorber may have a second convex portion protruding upward along a direction substantially parallel to the short edges of the body.

The first side walls may include outer surfaces, the insulation case may have corners where the lower surface of the body meets the outer surfaces of the first side walls and the corners may be rounded.

The insulation case may include a body having a plate-like shape defining a bottom of the insulation case and having short edges and long edges, first side walls protruding upward from the short edges of the body, and second side walls protruding upward from the long edges of the body, and the impact absorber may have a second concave portion protruding downward along a direction substantially parallel to the short edges of the body.

The first side walls may include outer surfaces, the insulation case may have corners where the lower surface of the body meets the outer surfaces of the first side walls and the corners may be rounded.

The insulation case may include a body having a plate-like shape defining a bottom of the insulation case and having short edges and long edges, and first side walls protruding upward from the short edges of the body, and the impact absorber may have alternating convex portions and concave portions along the body.

The first side walls may include outer surfaces, the insulation case may have corners where the lower surface of the body meets the outer surfaces of the first side walls and the corners may be rounded.

The long edges may have a length and the convex portions and concave portions may have radii of curvature, and the sum of the radii of curvature of the convex portions and the radii of curvature of the concave portions may be about one half of the length of the long edges of the body.

The radii of curvature of the convex portions and the radii of curvature of the concave portions may be about the same.

The insulation case may include a body having a plate-like shape defining a bottom of the insulation case and having short edges and long edges, and first side walls protruding upward from the short edges of the body, and the body may have a variable thickness and a center, and the thickness of the body measured from the center of the body may gradually become thinner toward the short edges of the body.

The first side walls may include outer surfaces, the insulation case may have corners where the lower surface of the body meets the outer surfaces of the first side walls and the corners may be rounded.

At least one of the above and other features and advantages may also be realized by providing a secondary battery including an electrode assembly, a cylindrical can having an opening and housing the electrode assembly, a cap assembly sealing the opening of the can, and an upper insulation plate disposed between the electrode assembly and the cap assembly and having an impact absorber.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
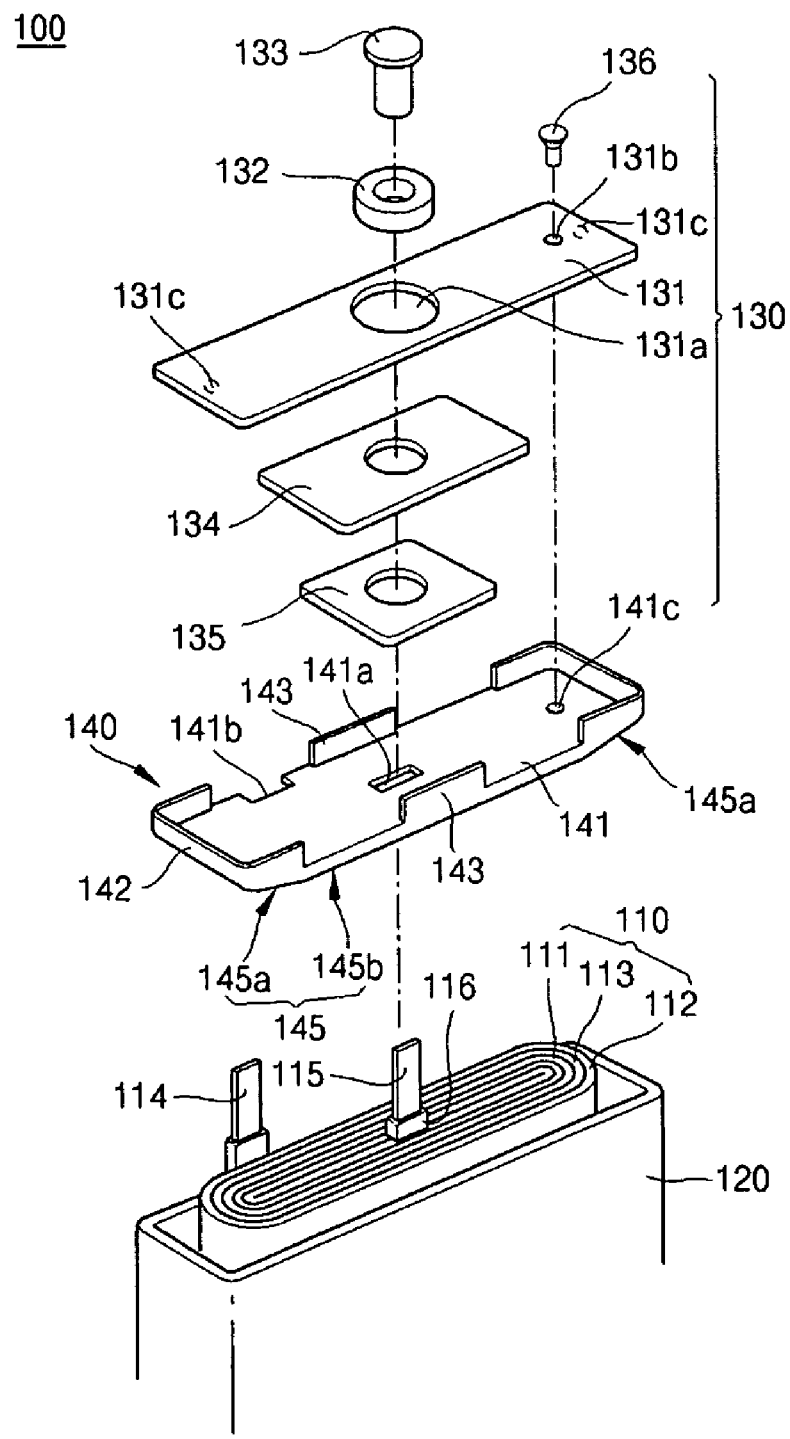
FIG. 1A illustrates an exploded perspective view of a secondary battery according to an embodiment.

Korean Patent Application No. 10-2008-0091636, filed on Sep. 18, 2008, in the Korean Intellectual Property Office, and entitled: "Lithium Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout. Hereinafter, exemplary embodiments will be described in detail with reference to the accompanying drawings.

Figure 1B:
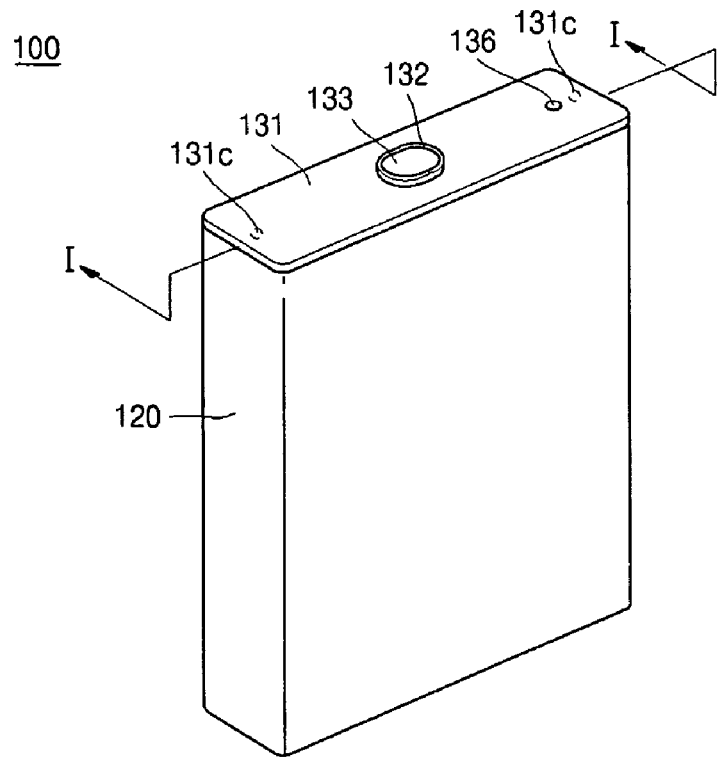
FIG. 1B illustrates a perspective view of the secondary battery illustrated in FIG. 1A.
Figure 1C:
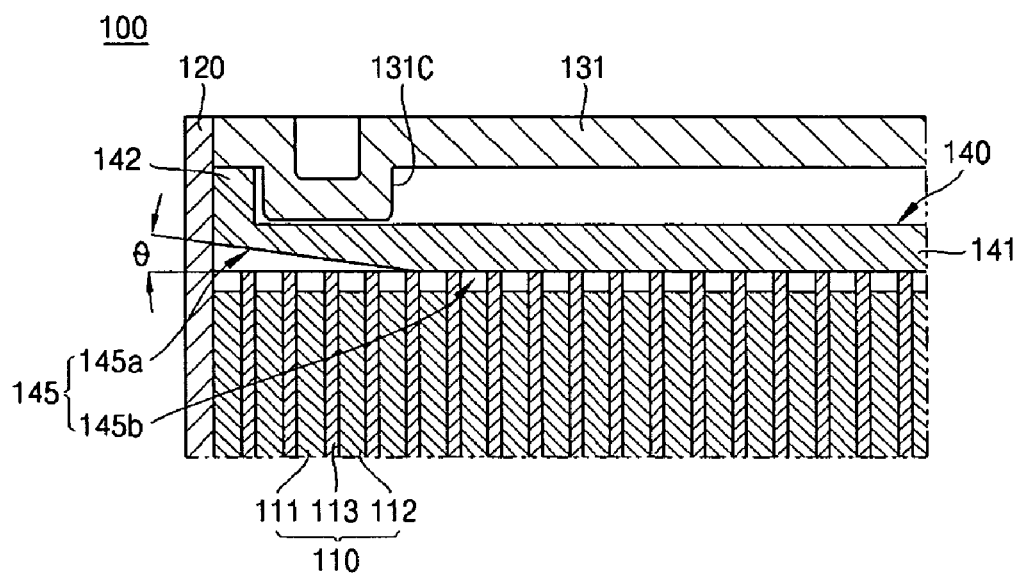
FIG. 1C illustrates a partial sectional view taken along line I-I of FIG. 1B.
Figure 1D:
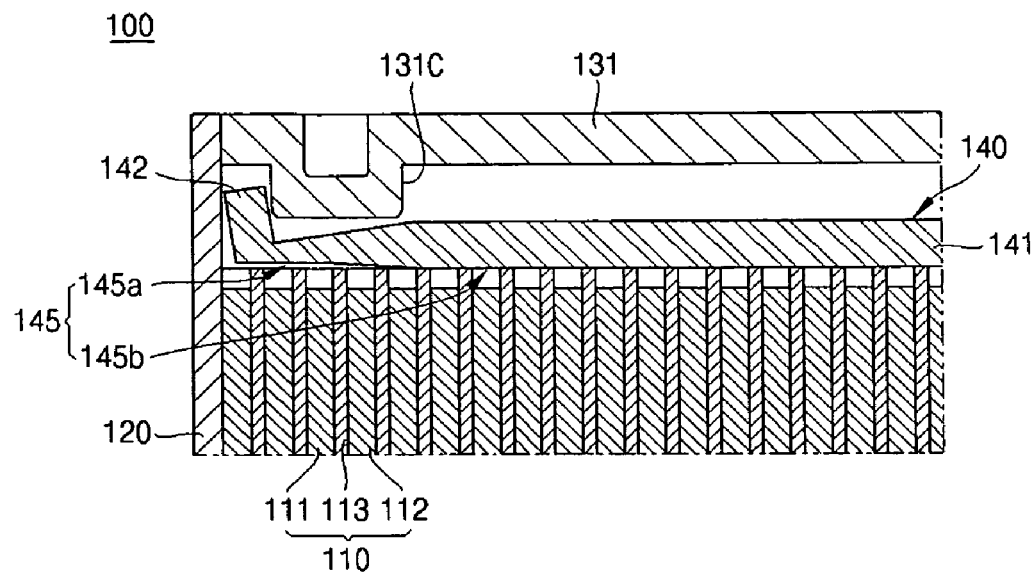
FIG. 1D illustrates a partial sectional view of deformation of an insulation case of the secondary battery illustrated in FIG. 1A due to an impact.
Figure 2A:
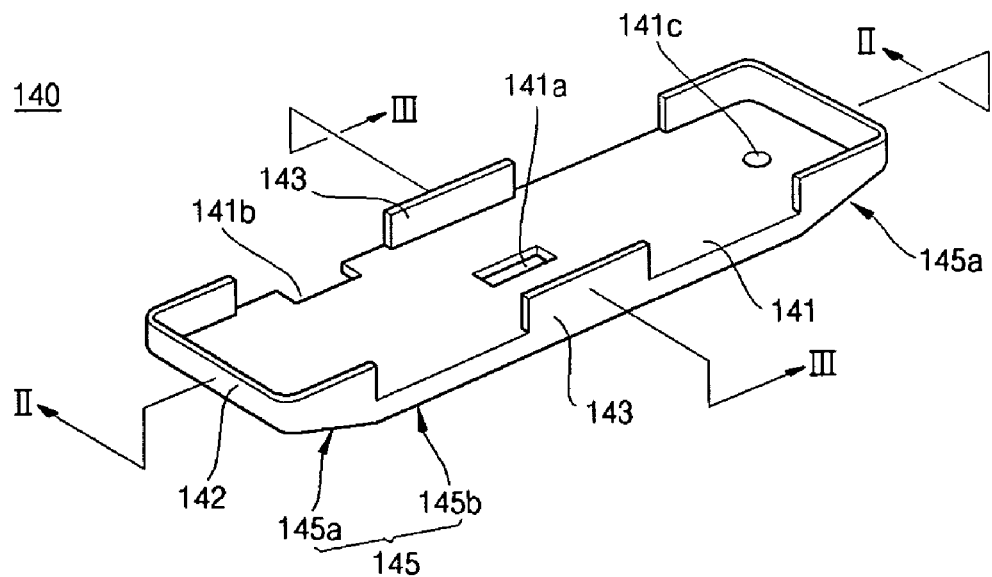
FIG. 2A illustrates a perspective view of an insulation case according to an embodiment.
Figure 2B:
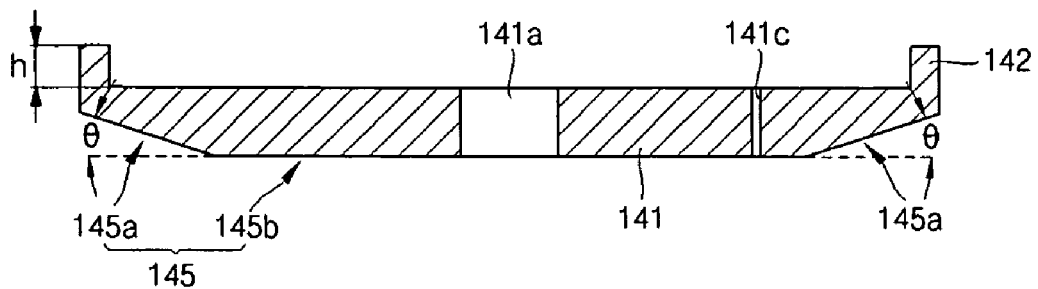
FIG. 2B illustrates a sectional view of a long edge of the insulation case of FIG. 2A taken along line II-II of FIG. 2A.
Figure 2C:
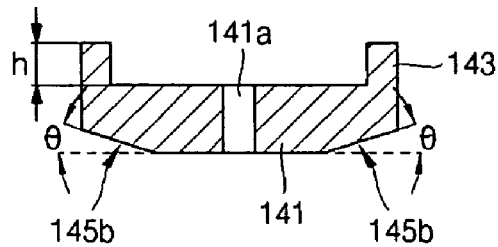
FIG. 2C illustrates a sectional view of a short edge of the insulation case of FIG. 2A taken along line III-III of FIG. 2A.

FIG. 1A illustrates an exploded perspective view of a secondary battery according to a first embodiment. FIG. 1B illustrates a perspective view of the secondary battery illustrated in FIG. 1A. FIG. 1C illustrates a partial sectional view taken along line I-I of FIG. 1B. FIG. 1D illustrates a partial sectional view of deformation of an insulation case of the secondary battery illustrated in FIG. 1A due to an impact. FIG. 2A illustrates a perspective view of an insulation case according to the first embodiment. FIG. 2B illustrates a sectional view of a long edge of the insulation case of FIG. 2A that is taken along line II-II of FIG. 2A. FIG. 2C illustrates a sectional view of a short edge of the insulation case of FIG. 2A that is taken along line III-III of FIG. 2A.

Referring to FIGS. 1A to 1D and 2A to 2C, the secondary battery 100 according to the first embodiment may include an electrode assembly 110, a can 120, a cap assembly 130 and an insulation case 140. The secondary battery may be a lithium secondary battery. In the secondary battery 100, the electrode assembly 110 may be accommodated in the can 120, which has an opening at its upper portion; and the opening of the can 120 may be sealed by the cap assembly 130. The cap assembly 130 may include a cap plate 131 having protrusions 131c at lower portions of its short edges. The insulation case 140 may be between the electrode assembly 110 and the cap assembly 130 to electrically insulate the electrode assembly 110 and the cap assembly 130. Also, the insulation case 140 may contact the protrusions 131c of the cap plate 131. The insulation case 140 may include an impact absorber 145 configured to deform when an external impact is applied thereto to absorb the external impact. Therefore, in the secondary battery 100 according to an embodiment, stress due to, e.g., falling and/or impact, to the secondary battery 100 may be minimized through the above-mentioned structure.

The electrode assembly 110 may include a positive electrode plate 111, a negative electrode plate 112 and a separator 113 interposed therebetween. The electrode assembly 110 may further include a positive electrode tab 114 and a negative electrode tab 115 whose ends each protrude upward. The positive electrode tab 114 may extend from the positive electrode plate 111 and the negative electrode tab 115 may extend from the negative electrode plate 112. The positive electrode tab 114 and the negative electrode tab 115 may include, e.g., aluminum (Al), nickel (Ni), or copper (Cu). The positive electrode tab 114 is generally made of aluminum (Al), and the negative tab 115 is generally made of nickel (Ni). Insulation tape 116 for preventing short-circuit between the electrode plates 111 and 112 may be wound at portions of the positive electrode tab 114 and the negative electrode tab 115 that protrude from the upper end of the electrode assembly 110. In the electrode assembly 110, the separator 113 insulating the positive electrode plate 111 and the negative electrode plate 112 may be interposed between the positive electrode plate 111 and the negative electrode plate 113 to stack and wind the positive electrode plate 111, the separator 113 and the negative electrode plate 112 in a jelly roll configuration. A positive electrode active material and a negative electrode active material may be coated on the positive electrode plate 111 and the negative electrode plate 112, respectively. The positive electrode active material may include, e.g., a lithium manganese based oxide of high stability and the negative active material may include, e.g., a carbon based material.

The can 120 may have a substantially parallelepipedal shape having an opening at its upper portion and may be made of a metal. The can 120 may be formed by a machining method, e.g., deep drawing. The can 120 may include, e.g., aluminum or an aluminum alloy that is a light, conductive metal. Accordingly, the can 120 itself may serve as a terminal. The can 120 may function as a housing for receiving the electrode assembly 110 and electrolyte, and the opening for introducing the electrode assembly 110 may be sealed by the cap assembly 130.

The cap assembly 130 may include a cap plate 131, a gasket 132, an electrode terminal 133, an insulation plate 134, a terminal plate 135 and a plug 136. The cap plate 131 may include a terminal through-hole 131a and an electrolyte injection hole 131b. The cap plate 131 may further include protrusions 131c at lower portions of its short edges. The terminal through-hole 131a may provide a passage through which the electrode terminal 133 may be inserted. In order to insulate the cap plate 131 and the electrode terminal 133, which are made of metal, the electrode terminal 133 may be inserted into the terminal through-hole 131a with the gasket 132, which may be made of an insulation material, disposed at the outer wall of the terminal through-hole 131a. The electrolyte injection hole 131b for injecting the electrolyte into the can 120 may be disposed on a side of the cap plate 131, and after injection of the electrolyte through the electrolyte injection hole 131b, the electrolyte injection hole 131b may be sealed with a plug 136 to prevent leakage of the electrolyte. The protrusion 131c may accommodate a screw (not shown) used as a coupling means when the secondary battery 100 is assembled, and may protrude from a lower portion of a short edge of the cap plate 131 in order to secure to a space for screw-coupling. The insulation plate 134 may be under the cap plate 131, and the terminal plate 135 may be under the insulation plate 134. The insulation plate 134 may insulate the cap plate 131 and the terminal plate 135. Meanwhile, the terminal plate 135 may be coupled to both a lower end portion of the electrode terminal 133 and the negative electrode tab 115. Accordingly, the negative electrode plate 112 of the electrode assembly 110 may be electrically connected to the electrode terminal 133 through the negative electrode tab 115 and the terminal plate 135. The positive electrode plate 111 of the electrode assembly 110 may be electrically connected to the cap plate 131 and the can 120 through the positive electrode tab 114.

The insulation case 140 may be between the electrode assembly 110 and the cap assembly 130. The insulation case 140 may be under the terminal plate 135. The insulation case 140 may contact the protrusions 131c formed at lower portions of short edges of the cap plate 131. The insulation case 140 may include at least one insulating polymer resin, e.g., polypropylene (PP), polyphenylene sulfide (PPS), polyether sulfone (PES), and modified polyphenylene oxide (MPPO). The insulation case 140 may be injection-molded. The insulation case 140 may include a body 141, first side walls 142, second side walls 143 and an impact absorber 145.

The body 141 may be formed at the bottom of the insulation case 140, may have a shape and size corresponding to the opening of the can 120 and may have a plate-like shape having short edges and long edges. The upper surface of the body 141 may contact lower surfaces of the protrusions 131c. The body 141 may have a negative tab penetrating portion 141a, a positive tab penetrating portion 141b and an electrolyte introduction opening 141c.

The negative tab penetrating portion 141a may be disposed at a central portion of the upper surface of the body 141. The negative tab penetrating portion 141a may provide a passage for electrically connecting the negative electrode tab 115 extending from the electrode assembly 110 to the terminal plate 135. Accordingly, the negative tab penetrating portion 141 may be in the form of a hole.

The positive tab penetrating portion 141b may be disposed on a side surface of the body 141. The positive electrode tab penetrating portion 141b may provide a space for electrically connecting the positive electrode tab 114 extending from the electrode assembly 110 to the cap plate 131. Accordingly, the positive electrode penetrating portion 141 may be in the form of a recess.

The electrolyte introduction opening 141c may be disposed on a side of the upper surface of the body 141. The electrolyte introduction opening 141c may be disposed at a lower portion of the body 141 that corresponds to the electrolyte injection hole 131b of the cap plate 131. The electrolyte injected through the electrolyte injection hole 131b may be introduced through the electrolyte introduction opening 141c to provide a passage through which the electrolyte may be introduced and poured into the can 120. Accordingly, the electrolyte introduction opening 141c may be in the form of a hole.

The first side walls 142 may be disposed at opposite short edges of the body 141. The first side walls 142 may stably support the body 141 and increase the attaching force with the inner wall of the can 120 when the insulation case 140 is received in the can 120, thereby beneficially restraining movement of the insulation case 140. In addition, the first side walls 142 may prevent the negative electrode tab 115 extending through the negative electrode tab penetrating portion 141a in the body 141 from contacting the inner surface of the can 120, which may have a polarity opposite to that of the negative electrode tab 115.

One or two second side walls 143 may be disposed at long edges of the body 141. The second side walls 143 may protrude upward and preferably have a height (h) substantially the same as the height of the first side walls 142. The heights of the first side walls 142 and the second side walls 143 are preferably formed in consideration of spaces necessary for installation of the positive electrode tab 114 and the second electrode tab 115. The second side walls 143 may reinforce the strength of the long edges of the body 141.

The upper surfaces of the first side walls 142 and the second side walls 143 preferably make contact with the lower surface of the cap plate 131. An unnecessary space between the cap assembly 130 and the insulation case 140 may be eliminated while the volume efficiency of the secondary battery 100 may be maximized, thereby providing the secondary battery 100 with high capacity.

The impact absorber 145 may include first tapered portions 145a and second tapered portions 145b. The first tapered portions 145a may be defined as regions where the body 141 is tapered from its lower surface toward its short edges. The first tapered portions 145a may be disposed under the protrusions 131c at positions corresponding to the protrusions 131c and overlapping the entire lower surfaces of the protrusions 131c. The first tapered portions 145a may be disposed at positions corresponding to the first side walls 142. The second tapered portions 145b may be defined as regions where the body 141 is tapered from its lower surface toward its long edges. The second tapered portions 145b may be disposed at positions corresponding to the second side walls 143. As mentioned above, the impact absorber 145, including the first tapered portions 145a and the second tapered portions 145b, may be structurally prevented from making contact with the upper surface of the electrode assembly 110 during assembly of the secondary battery 100.

The impact absorber 145 may be deformed such that it becomes substantially parallel to the lower surface of the body 141 when a physical impact is applied to the assembled secondary battery 100 during a standard test, e.g., a drop test. In other words, the insulation case 140 according to an embodiment may include the impact absorber 145 configured to function as a resilient plate spring. The taper angle $\Theta$ of the first tapered portions 145a and the second tapered portions 145b is preferably about 13 degrees to about 48 degrees upward with respect to the lower surface of the body 141. Maintaining the taper angles $\Theta$ at about 13 degrees or greater may help ensure that, upon impact, the first tapered portions 145a and the second tapered portions 145b are not deformed below the lower surface of the body 141, thereby advantageously preventing local damage to the electrode assembly 110. In other words, damage to the electrode assembly 110 may be reduced, even if not completely prevented. Maintaining the taper angles $\Theta$ at about 48 degrees or less may help ensure that the corners where the first tapered portions 145a and the second tapered portions 145b meet the lower surface of the body are not sharp enough to cause damage to the electrode assembly 110. If the corners are too sharp, the first tapered portions 145a and the second tapered portions 145b may cause local damage to the electrode assembly 110 even before they are deformed parallel to the lower surface of the body 141 when an impact is applied to the secondary battery 100.

Hereinafter, the deformed structure due to an external impact of the secondary battery according to the first embodiment will be described in detail. As mentioned above, in the secondary battery 100, the protrusions 131c of the cap plate 131 may contact the upper surface of the body 141 of the insulation case 140. In addition, the upper surfaces of the first side walls 142 and the second side walls 143 may contact the lower surface of the cap plate 131. When a physical impact is applied to the top of the assembled secondary battery 100, the impact may be sequentially transferred from the upper side of the secondary battery 100 to the cap plate 131 and then to the insulation case 140 under the cap plate 131. Since the elements of the cap assembly 130, e.g., the cap plate 131, the electrode terminal 133, the insulation plate 134 and the terminal plate 135, may be compactly provided at central portions of the insulation case 140, and the second side walls 143 for reinforcing the strength of the long edges of the insulation case 140 may also be formed in the insulation case 140, the shape of the insulation case 140 may not be severely deformed despite the impact. However, the peripheral portions of the insulation case 140, e.g., the short edges of the insulation case 140 where the first side walls 142 are formed, may be relatively weak and configured such that they are deformed downward when an impact is applied. Since the insulation case 140 may include the impact absorber 145, it may have excellent deformation characteristics against an impact. In other words, the short edges of the insulation case 140 may be deformed by an impact, to absorb the impact. Accordingly, even when the short edges of the insulation case 140 are deformed downward by an impact, the impact may be absorbed during the deformation of the insulation case 140, whereby the first tapered portions 145a and the upper surface of the electrode assembly 110 do not contact each other or the lower surface of the body 141, and the first tapered portions 145a become parallel to each other, thereby preventing damage to the electrode assembly 110. When an impact to the secondary battery 100—including the insulation case 140 having the impact absorber 145 at its lower portion—subsides, the insulation case 140 which was deformed due to the impact may return to its original shape.

As mentioned above, the secondary battery 100 according to the first embodiment may include the insulation case 140 having the impact absorber 145. Therefore, according to the first embodiment, stress on the secondary battery due to, e.g., falling and/or impact, may be minimized. In other words, according to the first embodiment, damage to the electrode assembly 110 may be prevented by the insulation case 140, thereby preventing a short circuit between the electrode plates 111 and 112.

Figure 3:
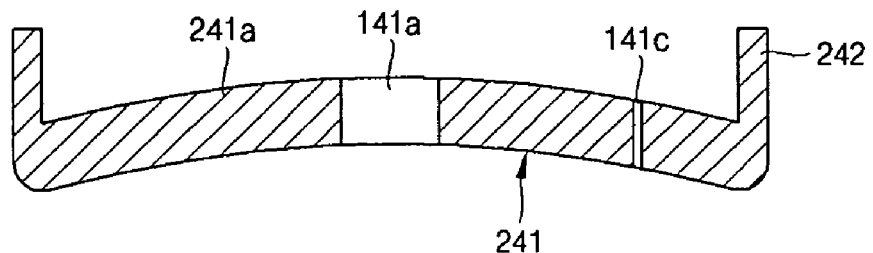
FIG. 3 illustrates a sectional view of a long edge of an insulation case according to a second embodiment.

Hereinafter, a secondary battery according to the second embodiment will be described in detail. FIG. 3 illustrates a sectional view of a long edge of an insulation case 240 according to the second embodiment.

The secondary battery according to the second embodiment has the same elements as those of the secondary battery according to the first embodiment except for the shape of the insulation case, so the same elements have the same reference numerals, and repeated descriptions thereof are omitted. Accordingly, in the second embodiment, the shape of the insulation case that is different from that of the secondary battery according to the first embodiment will be mainly described.

The secondary battery 100 according to the second embodiment may include an electrode assembly 110, a can 120, a cap assembly 130 and an insulation case 240. The insulation case 240 may be disposed between the electrode assembly 110 and the cap assembly 130. The insulation case 240 may be under a terminal plate 135. The insulation case 240 may include an impact absorber. The insulation case 240 may also include the same material of and be manufactured by the same machining method as the insulation case 140 according to the first embodiment, and it may perform the same function.

Referring to FIG. 3, the insulation case 240 may include a body 241 and first side walls 242. Corners of the insulation case 240 where the lower surface of the body 241 meets the outer surfaces of the first side walls 242 may be rounded.

The body 241 may have a plate-like shape defining short edges and long edges of the insulation case 240, as well as the bottom of the insulation case 240. The body 241 may include an impact absorber. The impact absorber may have a convex portion 241a protruding upward along a direction substantially parallel to the long edges of the body 241. The convex portion 241a may have a rounded shape extending from one short edge to the other edge of the body 241. Upon external impact, the curvature of the convex portion 241a may decrease such that the convex portion 241a may become gradually deformed and flattened. The convex portion 241a may absorb an external impact through the deformation thereof. That is, the convex portion 241a may be deformed by an impact, i.e., become flattened, thereby preventing damage to the electrode assembly 110 under the convex portion 241a. When the impact applied to the convex portion 241a dissipates, is absorbed or subsides, the convex portion 241a may return to its original shape.

The first side walls 242 may protrude upward from opposing short edges of the body 241. As mentioned above, the insulation case 240 according to the second embodiment may serve as or reinforce the function of a plate spring as compared with the insulation case 140 according to the first embodiment, thereby improving its durability against external impact.

Figure 4:
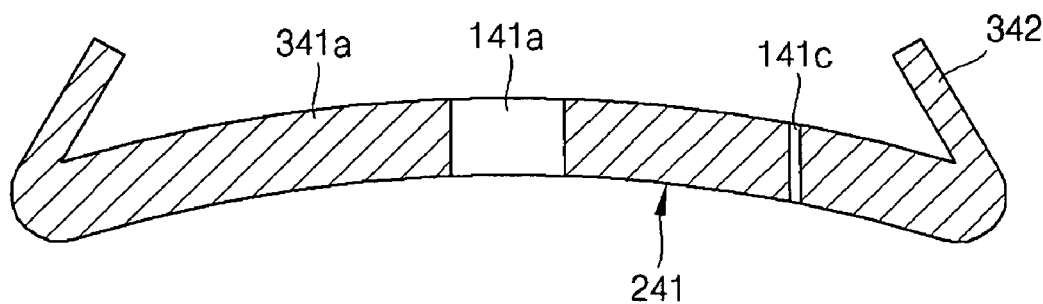
FIG. 4 illustrates a sectional view of a long edge of an insulation case according to a third embodiment.

Hereinafter, a secondary battery according to the third embodiment will be described in detail. FIG. 4 illustrates a sectional view of a long edge of an insulation case according to the third embodiment.

The secondary battery according to the third embodiment has the same elements as those of the secondary battery according to the second embodiment except that first side walls are inclined. The same elements are labeled with the same reference numerals, and repeated descriptions thereof are omitted. Accordingly, in the third embodiment, the first side walls different from those of the secondary battery according to the second embodiment will be mainly described.

The secondary battery 100 according to the third embodiment may include an electrode assembly 110, a can 120, a cap assembly 130 and an insulation case 340. The insulation case 340 may be disposed between the electrode assembly 110 and the cap assembly 130. The insulation case 340 may be under a terminal plate 135. The insulation case 340 may include an impact absorber. Also, the insulation case 340 may be made of the same material of and by the same machining method as those of the insulation case 240 according to the second embodiment, and it performs the same function.

Referring to FIG. 4, the insulation case 340 may include a body 241 and first side walls 342. Corners of the insulation case 340 where the lower surface of the body 241 meets the outer surfaces of the first side walls 342 may be rounded.

The first side walls 342 according to the third embodiment may be inclined toward the interior of the insulation case 342 with respect to an axis perpendicular to the upper surface of the body 241. The first side walls 342 may absorb more impact that the first side walls 242 according to the second embodiment, thereby improving the function of the restorable plate spring.

Figure 5:
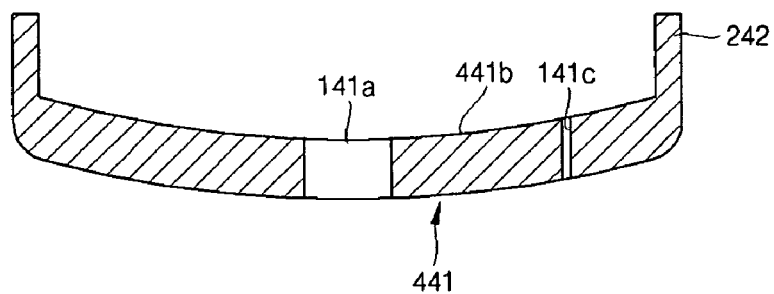
FIG. 5 illustrates a sectional view of a long edge of an insulation case according to a fourth embodiment.

Hereinafter, a secondary battery according to the fourth embodiment will be described in detail. FIG. 5 illustrates a sectional view of a long edge of an insulation case according to the fourth embodiment.

The secondary battery according to the fourth embodiment may have the same elements as those of the secondary battery according to the second embodiment, except that a concave portion may be formed in the body. The same elements are labeled with the same reference numerals and repeated descriptions thereof are omitted. Accordingly, in the fourth embodiment, the shape of the body that is different from that of the secondary battery according to the second embodiment will be mainly described.

The secondary battery 100 according to the fourth embodiment may include an electrode assembly 110, a can 120, a cap assembly 130 and an insulation case 440. The insulation case 440 may be disposed between the electrode assembly 110 and the cap assembly 130. The insulation case 440 may be under a terminal plate 135. The insulation case 440 may include an impact absorber. The insulation case 440 may be made of the same material of and by the same machining method as those of the insulation case 240 according to the second embodiment, and it performs the same function.

Referring to FIG. 5, the insulation case 440 may include a body 441 and first side walls 242. Corners of the insulation case 440 where the lower surface of the body 441 meets the outer surfaces of the first side walls 242 may be rounded.

The body 441 may have a plate-like shape having short edges and long edges and may define the bottom of the insulation case 440. An impact absorber may be formed in the body 441. The impact absorber may include a concave portion 441b protruding downward along a direction substantially parallel to the long edges of the body 441. When an external impact is applied to the secondary battery 100, the curvature of the concave portion 441b may decrease, i.e., be gradually flattened. The first side walls 242 may protrude upward from opposing short edges of the body 441. As compared with the convex portion 241a according to the second embodiment, the deformed and restored directions of the concave portion 441b are opposite to those of the convex portion 241a; but the concave portion 441b has the same function as that of the convex portion 241a.

Figure 6:
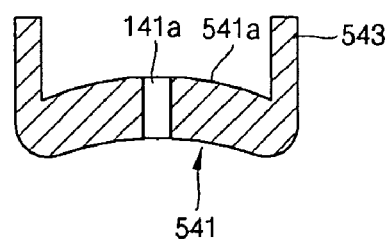
FIG. 6 illustrates a sectional view of a short edge of an insulation case according to a fifth embodiment.

Hereinafter, a secondary battery according to the fifth embodiment will be described in detail. FIG. 6 illustrates a sectional view of a short edge of an insulation case according to the fifth embodiment.

The secondary battery according to the fifth embodiment may have the same elements as those of the secondary battery according to the second embodiment, except for the direction of an impact absorber. The same elements are labeled with the same reference numerals, and repeated descriptions thereof are omitted. Accordingly, in the fifth embodiment, the shape of the body that is different from that of the secondary battery according to the second embodiment will be mainly described.

The secondary battery 100 according to the fifth embodiment may include an electrode assembly 110, a can 120, a cap assembly 130 and an insulation case 540. The insulation case 540 may be disposed between the electrode assembly 110 and the cap assembly 130. The insulation case 540 may be under a terminal plate 135. The insulation case 540 may include an impact absorber. The insulation case 540 may be made of the same material and by the same machining method as the insulation case 240 according to the second embodiment, and it performs the same function.

Referring to FIG. 6, the insulation case 540 may include a body 541 and second side walls 543. Corners of the insulation case 540 where the lower surface of the body 541 meets the outer surfaces of the second side walls 543 may be rounded.

The body 541 may have a plate-like shape having short edges and long edges and may define the bottom of the insulation case 540. An impact absorber may be formed in the body 541. The impact absorber may include a second convex portion 541*a* protruding upward along a direction substantially parallel to the short edges of the body 541. Meanwhile, the second side walls 543 may protrude upward along a direction parallel to the long edges of the body 541. As compared with the impact absorber according to the second embodiment, the impact absorber according to the fifth embodiment may effectively absorb an impact applied in the direction of the long edges of the insulation case 540.

Figure 7:
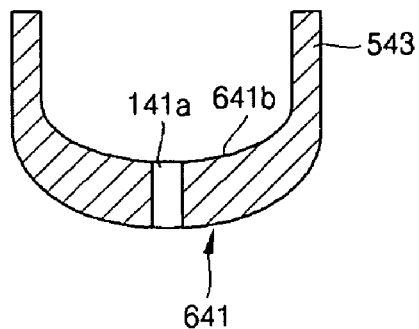
FIG. 7 illustrates a sectional view of a short edge of an insulation case according to a sixth embodiment.

Hereinafter, a secondary battery according to the sixth embodiment will be described in detail. FIG. 7 illustrates a sectional view of a short edge of an insulation case according to the sixth embodiment.

The secondary battery according to the sixth embodiment has the same elements as those of the secondary battery according to the fifth embodiment except for the shape of an impact absorber. The same elements are labeled with the same reference numerals, and repeated descriptions thereof are omitted. Accordingly, in the sixth embodiment, the shape of the body that is different from that of the secondary battery according to the fifth embodiment will be mainly described.

The secondary battery 100 according to the sixth embodiment may include an electrode assembly 110, a can 120, a cap assembly 130 and an insulation case 740. The insulation case 740 may be disposed between the electrode assembly 110 and the cap assembly 130. The insulation case 740 may be under a terminal plate 135. The insulation case 740 may include an impact absorber. The insulation case 740 may be made of the same material of and by the same machining method as those of the insulation case 240 according to the fifth embodiment, and it performs the same function.

Referring to FIG. 7, the insulation case 640 may include a body 641 and second side walls 543. Corners of the insulation case 640 where the lower surface of the body 641 meets the outer surfaces of the second side walls 543 may be curved or rounded.

The body 641 may have a plate-like shape having short edges and long edges, and may define the bottom of the insulation case 640. An impact absorber may be formed in the body 641. The impact absorber may include a second concave portion 641*b* protruding downward along a direction substantially parallel to the short edges of the body 641. As compared with the second convex portion 541*a* according to the fifth embodiment, only the deformed and restored directions of the second concave portion 641*b* are opposite to those of the second convex portion 541*a*, but the second concave portion 641*b* has the same function as that of the second convex portion 541*a*.

Figure 8:
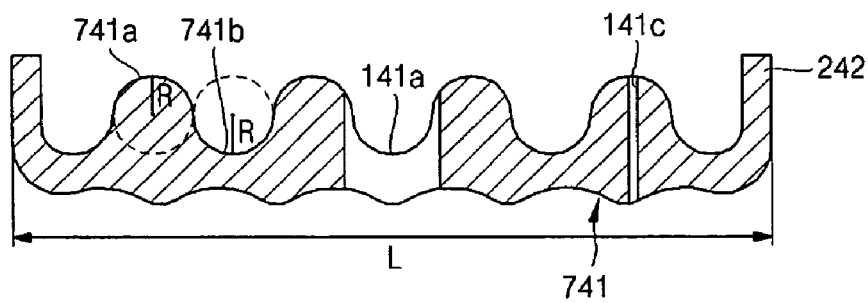
FIG. 8 illustrates a sectional view of a long edge of an insulation case according to a seventh embodiment.

Hereinafter, a secondary battery according to a seventh embodiment will be described in detail. FIG. 8 illustrates a sectional view of a long edge of an insulation case according to the seventh embodiment.

The secondary battery according to the seventh embodiment has the same elements as those of the secondary battery according to the second embodiment except for the shape of the impact absorber. The same elements are labeled with the same reference numerals, and repeated descriptions thereof are omitted. Accordingly, in the seventh embodiment, the shape of the body that is different from that of the secondary battery according to the second embodiment will be mainly described.

The secondary battery 100 according to the seventh embodiment may include an electrode assembly 110, a can 120, a cap assembly 130 and an insulation case 740. The insulation case 740 may be disposed between the electrode assembly 110 and the cap assembly 130. The insulation case 740 may be under the terminal plate 135. The insulation case 740 may include an impact absorber. The insulation case 740 may be made of the same material and by the same machining method as those of the insulation case 740 according to the second embodiment, and performs the same function.

Referring to FIG. 8, the insulation case 740 may include a body 741 and first side walls 242. Corners of the insulation case 740 where the lower surface of the body 741 meets the outer surfaces of the first side walls 242 may be rounded.

The body 741 may have a plate-like shape having short edges and long edges, and may define the bottom of the insulation case 740. An impact absorber may be formed in the body 741. In the impact absorber, convex portions 741*a* and concave portions 741*b* may be alternately disposed in the body 741. When an external impact is applied to the insulation case 740, the curvatures of the convex portions 741*a* and the concave portions 741*b* may be simultaneously reduced such that the body 741 becomes gradually flattened. The convex portions 741*a* and the concave portions 741*b* may be simultaneously deformed and restored, but the deformed and restored directions thereof are opposite to each other. The external impact may thereby be absorbed more effectively. The radii R of curvatures of the convex portions 741*a* and the concave portions 741*b* are preferably the same, and the sum of them is preferably one half of the length L of the long edge of the body 741. Maintaining the radii R of curvature of the convex portions 741*a* and the concave portions 741*b* about the same or equal may help ensure that, when an external impact is applied to the insulation case 710, the body 741 may be flattened, thereby preventing damage to the electrode assembly 110 under the insulation case 710. As mentioned above, as compared with the insulation case 240 according to the second embodiment, the insulation case 740 according to the seventh embodiment may absorb an external impact even more effectively.

Figure 9:
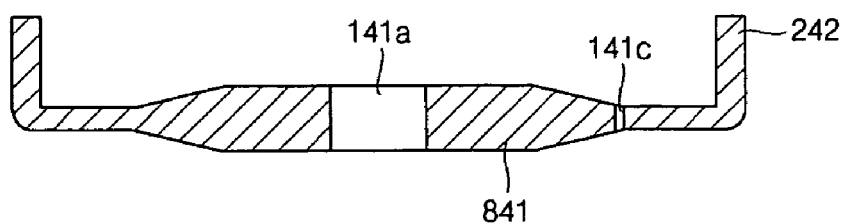
FIG. 9 illustrates a sectional view of a long edge of an insulation case according to an eighth embodiment.

Hereinafter, a secondary battery according to the eighth embodiment will be described in detail. FIG. 9 illustrates a sectional view of a long edge of an insulation case according to the eighth embodiment.

The secondary battery according to the eighth embodiment has the same elements as those of the secondary battery according to the second embodiment except for the shape of an impact absorber. The same elements are labeled with the same reference numerals and repeated descriptions thereof are omitted. Accordingly, in the eighth embodiment, the shape of the body that is different from that of the secondary battery according to the second embodiment will be mainly described.

The secondary battery 100 according to the eighth embodiment may include an electrode assembly 110, a can 120, a cap assembly 130 and an insulation case 840. The insulation case 840 may be disposed between the electrode assembly 110 and the cap assembly 130. The insulation case 840 may be under a terminal plate 135. The insulation case 840 may be made of the same material and by the same machining method as the insulation case according to the second embodiment, and performs the same function.

Referring to FIG. 9, the insulation case 840 may include a body 841 and first side walls 242. Corners of the insulation case 840 where the lower surface of the body 841 meets the outer surfaces of the first side walls 242 may be rounded.

The body 841 may have a plate-like shape having short edges and long edges, and may define the bottom of the insulation case 840. The thickness of the body 841 may become gradually thinner going from the center of the body 841 toward the short edges thereof. In other words, the thickness of the parts of the body 841 at the short edges may be thinner than the thickness of the parts of the body 841 at the long edges near the center thereof. This structure may more effectively absorb an applied impact. Accordingly, the short edges of the body 841 may function as the impact absorber according to the eighth embodiment.

Figure 10A:
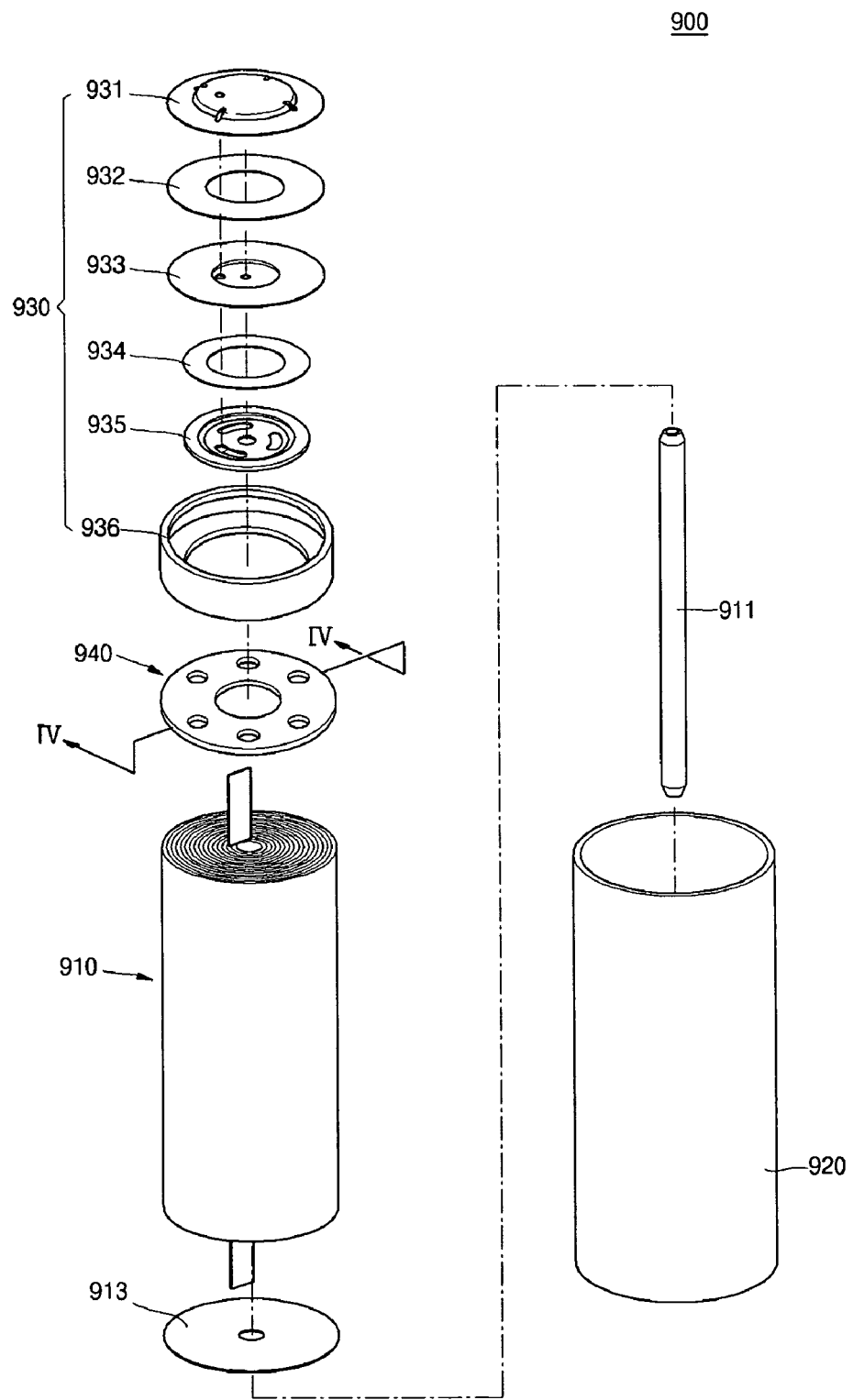
FIG. 10A illustrates an exploded perspective view of a secondary battery according to another embodiment.
Figure 10B:
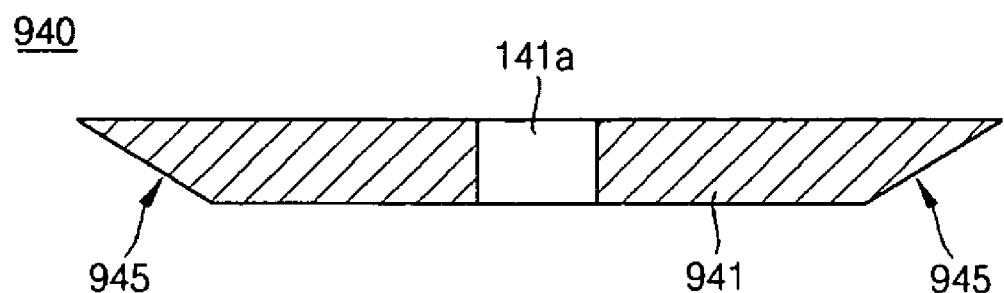
FIG. 10B illustrates a sectional view taken along line IV-IV of FIG. 10A.

Hereinafter, a secondary battery according to another embodiment will be described in detail. FIG. 10A illustrates an exploded perspective view of a secondary battery according to another embodiment. FIG. 10B illustrates a sectional view taken along line IV-IV of FIG. 10A.

Referring to FIGS. 10A and 10B, the secondary battery according to the embodiment may be a cylinder type battery. The secondary battery 900 may include an electrode assembly 910, a cylindrical can 920 housing the electrode assembly 910 and a cap assembly 930 sealing an opening at the upper end of the can 920. The cap assembly 930 may includes a cap upper 931, a secondary protection device 932 under the cap upper 931, a safety vent 933 under the secondary protection device 932, an insulator 934 under the safety vent 933, a cap lower 935 under the insulator 934 and a gasket 936 surrounding them. The secondary battery 900 may include an upper insulation plate 940. The electrode assembly 910 may further include a center pin 911 inserted into the hollow portion of the electrode assembly 910 to prevent deformation of the electrode assembly 910. The secondary battery 900 may further include a lower insulation plate 913 under the electrode assembly 910.

In the secondary battery 900, the upper insulation plate 940 may include an impact absorber 945 on the lower surface thereof. The impact absorber 945 may be continuously formed along the periphery of the upper insulation plate 940. The impact absorber 945 may perform the same function as that of the impact absorber 145 according to the first embodiment. Accordingly, when an external impact is applied to the secondary battery 900, stress may be minimized. In other words, the secondary battery 900 may prevent damage to the electrode assembly 910 due to the upper insulation plate 940, thereby preventing a short circuit between electrodes.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
an electrode assembly;
a can having an opening at an upper portion thereof and housing the electrode assembly;
a cap assembly sealing the opening of the can; and
an insulation case disposed between the electrode assembly and the cap assembly, the insulation case having a first area contacting the electrode assembly and a second area located on a periphery of the first area such that there is a gap between the second area and the electrode assembly,
wherein:
the cap assembly contacts the insulation case on the second area,
the cap assembly includes a cap plate, the cap plate has short edges with lower portions, and protrusions at the lower portions of the short edges;
the insulation case includes:
a body having a plate-like shape defining a bottom of the insulation case and having short edges, long edges and a lower surface, and
first side walls protruding upward from the short edges of the body, and
the second area includes first tapered portions tapered from a lower surface of the body toward the short edges of the body.

2. The secondary battery as claimed in claim 1, wherein an angle of the first tapered portions is about 13 to about 48 degrees with respect to the lower surface of the body.

3. The secondary battery as claimed in claim 1, wherein the insulation case has second side walls protruding upward from the long edges of the body and the second area further includes second tapered portions tapered from the lower surface of the body toward the long edges of the body.

4. The secondary battery as claimed in claim 3, wherein an angle of the second tapered portions is about 13 to about 48 degrees with respect to the lower surface of the body.

5. The secondary battery as claimed in claim 1, wherein the insulation case contacts the protrusions.

6. The secondary battery as claimed in claim 1, wherein the first tapered portions are disposed under the protrusions.

7. A secondary battery, comprising:
an electrode assembly;
a can having an opening at an upper portion thereof and housing the electrode assembly;
a cap assembly sealing the opening of the can; and
an insulation case disposed between the electrode assembly and the cap assembly, the insulation case having a first area contacting the electrode assembly and a second area located on a periphery of the first area such that there is a gap between the second area and the electrode assembly,
wherein:
the cap assembly contacts the insulation case on the second area
the insulation case includes:
a body having a plate-like shape defining a bottom of the insulation case and having short edges and long edges; and
first side walls protruding upward from the short edges of the body, and
the second area has a convex portion protruding upward along a direction substantially parallel to the long edges of the body.

8. The secondary battery as claimed in claim 7, wherein the body includes a first short edge and a second short edge opposite to the first short edge, and the convex portion has a rounded shape and extends from the first short edge to the second short edge of the body.

9. The secondary battery as claimed in claim 7, wherein the insulation case has an interior and the first side walls are inclined toward the interior of the insulation case.

10. The secondary battery as claimed in claim 7, wherein the first side walls include outer surfaces, the insulation case has corners where the lower surface of the body meets the outer surfaces of the first side walls and the corners are rounded.

11. A secondary battery, comprising:
an electrode assembly;
a can having an opening at an upper portion thereof and housing the electrode assembly;
a cap assembly sealing the opening of the can; and
an insulation case disposed between the electrode assembly and the cap assembly, the insulation case having a first area contacting the electrode assembly and a second area located on a periphery of the first area such that there is a gap between the second area and the electrode assembly, wherein:
the cap assembly contacts the insulation case on the second area
the insulation case includes:
- a body having a plate-like shape defining a bottom of the insulation case and having short edges and long edges; and
- first side walls protruding upward from the short edges of the body, and the second area and the first area respectively have alternating convex portions and concave portions along the body.

12. The secondary battery as claimed in claim 11, wherein the first side walls include outer surfaces, the insulation case has corners where the lower surface of the body meets the outer surfaces of the first side walls and the corners are rounded.

13. The secondary battery as claimed in claim 11, wherein the long edges have a length and the convex portions and concave portions have radii of curvature, and the sum of the radii of curvature of the convex portions and the radii of curvature of the concave portions is about one half of the length of the long edges of the body.

14. The secondary battery as claimed in claim 13, wherein the radii of curvature of the convex portions and the radii of curvature of the concave portions are about the same.

* * * * *